United States Patent
Early

(10) Patent No.: US 6,463,391 B1
(45) Date of Patent: Oct. 8, 2002

(54) METHOD AND APPARATUS FOR CALCULATING CONFIDENCE INTERVALS

(75) Inventor: Thomas Alan Early, Clifton Park, NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/576,688

(22) Filed: May 23, 2000

Related U.S. Application Data (60) Provisional application No. 60/171,381, filed on Dec. 22, 1999.

(51) Int. Cl.$^7$ .................................. G06F 101/14
(52) U.S. Cl. .................................. 702/85; 702/181
(58) Field of Search ................... 700/93; 702/85, 702/179, 181

(56) References Cited

U.S. PATENT DOCUMENTS

| | | | | |
|---|---|---|---|---|
| 5,301,118 A | * | 4/1994 | Heck et al. ................. | 364/468 |
| 5,452,218 A | * | 9/1995 | Tucker et al. ............... | 364/468 |
| 5,581,466 A | * | 12/1996 | Van Wyk et al. ............. | 364/468.01 |
| 5,715,181 A | * | 2/1998 | Horst ......................... | 364/554 |
| 5,731,572 A | * | 3/1998 | Winn ......................... | 235/70 R |
| 5,777,841 A | * | 7/1998 | Stone et al. ................. | 364/554 |
| 5,956,251 A | * | 9/1999 | Atkinson et al. ........... | 364/468.16 |
| 6,015,667 A | * | 1/2000 | Sharaf ........................ | 435/6 |
| 6,065,005 A | * | 5/2000 | Gal et al. .................... | 707/7 |
| 6,182,070 B1 | * | 1/2001 | Megiddo et al. ............ | 707/6 |
| 6,184,048 B1 | * | 2/2001 | Ramon ........................ | 438/14 |
| 6,253,115 B1 | * | 6/2001 | Martin et al. ............... | 700/97 |
| 6,257,057 B1 | * | 7/2001 | Hulsing, II ................. | 73/504.04 |
| 6,298,470 B1 | * | 10/2001 | Breiner et al. .............. | 716/4 |
| 6,341,271 B1 | * | 1/2002 | Salvo et al. ................. | 705/28 |

OTHER PUBLICATIONS

Smith, B;"Six–Sigma Design"; IEEE Spectrum; vol. 30 Issue 9; 1993; pp. 43–47.*

Horst, R L;"Making The Six–Sigma Leap Using SPC Data"; IEEE 24$^{th}$ Electronics Manufacturing Technology Symposium; 1999; pp 50–53.*

Hoehn, W K;"Robust Designs Through Design To Six–Sigma Manufacturability";Proceedings IEEE Annual International Engineering Management Conference, Global Engineering Management Emerging Trends In The Asia Pacific; 1995; pp. 241–246.*

Higge, P B;"A Quality Process Approach To Electronic Systems Reliability"; Proceedings IEEE Reliability And Maintainability Symposium; 1993; pp. 100–105.*

* cited by examiner

*Primary Examiner*—John S. Hilten
*Assistant Examiner*—Douglas N Washburn
(74) *Attorney, Agent, or Firm*—Noreen C. Johnson; Christian G. Cabou (57) ABSTRACT

An exemplary embodiment of the invention is an apparatus and method for calculating confidence intervals. The method comprises activating a calculator. The user selects input data for the calculator. The calculator reformats the input data into output data. The calculator then generates a specific calibration summary using the output data. The calculator plots a linear calibration curve derived from the specific calibration summary. The calculator then plots a calibration residual value plot derived from the specific calibration summary. The calculator calculates a back-calculated unknown sample value. Lastly, the calculator calculates a confidence interval for said at least one back-calculated unknown sample value.

18 Claims, 8 Drawing Sheets

| Solution Label | Type | Element | Soln Conc | Corr Conc | Conc | Date | Time | NumReps | Replicates | | | |
|---|---|---|---|---|---|---|---|---|---|---|---|---|
| 40.08 | Std | Cu327.396 | 40.080002 | | 40.08 | 5/14/98 | 11:46:50 | 4 | 41404 | 40490 | 41134 | 40598 |
| 40.08 | Std | Fe259.940 | 40.080002 | | 40.08 | 5/14/98 | 11:48:00 | 4 | 1343 | 1314 | 1299 | 1374 |
| 40.08 | Std | Na589.592 | 40.080002 | | 40.08 | 5/14/98 | 11:45:57 | 3 | 7524 | 7412 | 7169 | 7371 |
| 40.08 | Std | Y 371.030 | 1 | | 1 | 5/14/98 | 11:47:25 | 4 | 16007 | 15837 | 16072 | |
| 30.06 | Std | Cu327.396 | 29.314819 | | 30.06 | 5/14/98 | 11:51:41 | 4 | 30870 | 30727 | 29970 | 29774 |
| 30.06 | Std | Fe259.940 | 29.314819 | | 30.06 | 5/14/98 | 11:52:51 | 4 | 1048 | 1038 | 1028 | 1048 |
| 30.06 | Std | Na589.592 | 29.314819 | | 30.06 | 5/14/98 | 11:50:48 | 4 | 5556 | 5958 | 5805 | 5647 |
| 30.06 | Std | Y 371.030 | 0.9752102 | 0.975521 | | 5/14/98 | 11:52:16 | 3 | 15681 | 15758 | 15290 | |
| 20.04 | Std | Cu327.396 | 18.950871 | | 20.04 | 5/14/98 | 11:56:32 | 4 | 19350 | 19079 | 19427 | 19770 |
| 20.04 | Std | Fe259.940 | 18.950871 | | 20.04 | 5/14/98 | 11:57:43 | 4 | 820 | 799 | 756 | 775 |
| 20.04 | Std | Na589.592 | 18.950871 | | 20.04 | 5/14/98 | 11:55:40 | 4 | 4037 | 3953 | 3982 | 4091 |
| 20.04 | Std | Y 371.030 | 0.9456522 | 0.945652 | | 5/14/98 | 11:57:08 | 3 | 15168 | 15304 | 14841 | |
| 10.02 | Std | Cu327.396 | 8.6255646 | | 10.02 | 5/14/98 | 12:01:24 | 4 | 9007 | 8606 | 8809 | 8897 |
| 10.02 | Std | Fe259.940 | 8.6255646 | | 10.02 | 5/14/98 | 12:02:34 | 4 | 400 | 412 | 395 | 393 |
| 10.02 | Std | Na589.592 | 8.6255646 | | 10.02 | 5/14/98 | 12:00:32 | 4 | 1771 | 1814 | 1845 | 1823 |
| 10.02 | Std | Y 371.030 | 0.8608347 | 0.860835 | | 5/14/98 | 12:02:17 | 3 | 13935 | 13862 | 13451 | |
| Blank | Blk | Cu327.398 | 0 | | 0 | 5/14/98 | 12:06:17 | 4 | 235 | 245 | 229 | 245 |
| Blank | Blk | Fe259.940 | 0 | | 0 | 5/14/98 | 12:07:27 | 4 | 171 | 166 | 166 | 171 |
| Blank | Blk | Na589.592 | 0 | | 0 | 5/14/98 | 12:05:24 | 4 | 78 | 41 | 51 | 56 |
| Blank | Blk | Y371.030 | 1.61E-02 | 1.61E-02 | | 5/14/98 | 12:06:52 | 3 | 260 | 258 | 252 | |

| Element | Date-Time | Slope | Intercept | Std Error | R^2 | # Points | Xbar | SSx | Calibration? |
|---|---|---|---|---|---|---|---|---|---|
| Cu 327.639 | 5/14/98 11:46 | 1026.362 | -625 | 793.5696 | 0.998217 | 5 | 20.04 | 1004.004 | FALSE |
| Cu 327.396 | 5/14/98 11:46 | 1035.805 | -1468.26 | 1354.881 | 0.994914 | 5 | 20.04 | 1004.004 | TRUE |
| Fe 259.940 | 5/14/98 11:48 | 29.62575 | 152.1 | 38.54683 | 0.994967 | 5 | 20.04 | 1004.004 | FALSE |
| Fe 259.940 | 5/14/98 11:48 | 33.23306 | 21.79979 | 37.42781 | 0.996224 | 5 | 20.04 | 1004.004 | TRUE |
| Na 589.592 | 5/14/98 11:45 | 185.1622 | 88.55 | 175.4874 | 0.997323 | 5 | 20.04 | 1004.004 | FALSE |
| Na 589.592 | 5/14/98 11:45 | 187.3697 | -89.3908 | 166.3092 | 0.997651 | 5 | 20.04 | 1004.004 | TRUE |

1 Cu 327.396 Uncalibrated

| Row # | x | Observe | Calc | Residual | Raw Y | Calibration Factor |
|---|---|---|---|---|---|---|
| 2 | 40.08000183 | 40906.5 | 40511.6 | 394.8992 | 40906.5 | 1 |
| 8 | 30.05999947 | 30335.25 | 30227.45 | 107.8014 | 30335.25 | 1 |
| 10 | 20.04000092 | 19406.5 | 19943.3 | -536.8 | 19406.5 | 1 |
| 14 | 10.02000046 | 8829.75 | 9659.15 | -829.4 | 8829.75 | 1 |
| 18 | 0 | 238.5 | -625 | 863.5 | 238.5 | |

| Row # | Sample | Element | Calibrated? | Next | Date-Time | Cal. Row # | Y | X | Error |
|---|---|---|---|---|---|---|---|---|---|
| 9 | A-1 | Mg 280.270 | FALSE | | 6/15/98 16:12 | 2 | 44182.7 | 1.91824 | 0.01847 |
| 10 | B-1 | Mg 280.270 | FALSE | | 6/15/98 16:16 | 2 | 120395 | 5.28076 | 0.01822 |
| 11 | C-1 | Mg 280.270 | FALSE | | 6/15/98 16:19 | 2 | 237315 | 10.4393 | 0.01886 |
| 12 | D-1 | Mg 280.270 | FALSE | | 6/15/98 16:23 | 2 | 36902.3 | 1.59704 | 0.01853 |
| 13 | E-1 | Mg 280.270 | FALSE | | 6/15/98 16:27 | 2 | 67363.3 | 2.94098 | 0.01834 |
| 14 | F-1 | Mg 280.270 | FALSE | | 6/15/98 16:30 | 2 | 416.333 | -0.01273 | 0.01886 |
| 15 | A-2 | Mg 280.270 | FALSE | | 6/15/98 16:34 | 2 | 216021 | 9.49979 | 0.01866 |
| 16 | B-2 | Mg 280.270 | FALSE | | 6/15/98 16:38 | 2 | 35894.7 | 1.55258 | 0.01853 |
| 17 | C-2 | Mg 280.270 | FALSE | | 6/15/98 16:42 | 2 | 68736.7 | 3.00157 | 0.01833 |
| 18 | D-2 | Mg 280.270 | FALSE | | 6/15/98 16:45 | 2 | 135681 | 5.95517 | 0.01823 |
| 19 | F-2 | Mg 280.270 | FALSE | | 6/15/98 16:49 | 2 | 534.333 | -0.00753 | 0.01885 |
| 20 | 0.1ppm | Mg 280.270 | FALSE | | 6/15/98 16:53 | 2 | 7 | -0.03079 | 0.01886 |

FIG. 8

| Element Na 589.592 | Sample Concentration *Internal calib. calc. are in bold.* | Error | 90% PI | 95% PI | 99% PI |
|---|---|---|---|---|---|
| rb1002 | 1991.89 ± | 59.76 | 140.64 | 190.19 | 349.05 |
| rb10.02 | 0990.48 ± | 55.95 | 131.67 | 178.05 | 326.79 |
| rb20.04 | 1445.68 ± | 53.58 | 126.09 | 170.52 | 312.95 |
| rb20.04 | 1417.38 ± | 49.99 | 117.84 | 159.09 | 291.98 |
| rb30.06 | 1034.76 ± | 51.92 | 122.19 | 165.23 | 303.25 |
| rb30.06 | 1014.28 ± | 48.62 | 114.41 | 154.72 | 283.96 |
| rb40.08 | 463.77 ± | 54.35 | 127.90 | 172.96 | 317.45 |
| rb40.08 | 442.67 ± | 51.08 | 120.21 | 162.55 | 298.34 |
| GR&Rjpl10-1 BPA | 1706.40 ± | 56.02 | 131.84 | 178.29 | 327.22 |
| GR&Rjpl10-1 BPA | 1527.86 ± | 50.80 | 119.55 | 161.66 | 396.71 |
| GR&Rjpl10-2 BPA | 2000.80 ± | 59.89 | 140.95 | 190.61 | 349.83 |
| GR&Rjpl10-2 BPA | 2043.80 ± | 56.70 | 133.44 | 180.45 | 331.19 |
| GR&Rjpl10-3 DPC | 1296.15 ± | 52.65 | 123.91 | 167.56 | 307.52 |
| GR&Rjpl10-3 DPC | 1449.90 ± | 50.21 | 118.16 | 159.79 | 293.26 |
| GR&Rjpl10-4 DPC | 854.51 ± | 52.10 | 122.60 | 165.80 | 304.29 |
| GR&Rjpl10-4 DPC | 939.87 ± | 48.65 | 114.48 | 154.82 | 284014 |
| GR&Rjpl10-5 | 197.25 ± | 57.22 | 134.66 | 182.10 | 334.21 |
| GR&Rjpl10-5 | 227.49 ± | 53.24 | 125.29 | 169.43 | 310.95 |
| rb20.04 | -14.60 ± | 60.16 | 141.58 | 191.46 | 351.39 |
| rb20.04 | 23.95 ± | 55.80 | 131.33 | 177.59 | 325.94 |
| rb10.02 | 1064.59 ± | 51.94 | 122.24 | 165.31 | 303.40 |
| rb10.02 | 962.08 ± | 48.63 | 114.44 | 154.76 | 284.03 |

Copyright © 1998 by General Electric

METHOD AND APPARATUS FOR CALCULATING CONFIDENCE INTERVALS

The present application claims benefit of U.S. Provisional Application Serial No. 60/171,381, entitled "Method and Apparatus for Calculating Confidence Intervals", filed on Dec. 22, 1999 in the name of Early.

The present application is related to copending U.S. Patent application Ser. No. 09/576,680, entitled "Method and Apparatus for Calculating Confidence Intervals," filed on May 23, 2000 in the name of Early et al., copending U.S. Patent application Ser. No. 09/576,988, entitled "Method and Apparatus for Calculating Confidence Intervals," filed on May 23, 2000 in the name of Early, and copending U.S. Patent application Ser. No. 09/617,940, entitled "Method of Confidence Scoring," filed on Aug. 25, 2000 in the name of Wakeman et al.

BACKGROUND OF THE INVENTION

A portion of the disclosure of this patent document contains material that is subject to copyright protection. The copyright owner has no objection to the facsimile production by any one of the patent disclosure, as it appears in the Patent and Trademark Office files or records, but otherwise reserves all copyrights rights whatsoever.

This invention relates to prediction interval calculators and, more particularly, to a prediction interval calculator that performs a complete statistical analysis of the output of an inductively coupled plasma spectrophotometer in accordance with Six Sigma.

With the advent of the worldwide marketplace and the corresponding consumer demand for highly reliable products, quality has become an increasingly important issue. The quality of a company's product line can therefore play a decisive role in determining the company's reputation and profitability. As a result of this pressure for defect-free products, increased emphasis is being placed on quality control at all levels; it is no longer just an issue with which quality control managers are concerned. This has led to various initiatives designed to improve quality, such as the Total Quality Management (TQM) and the Six Sigma quality improvement programs. An overview of the Six Sigma program is presented by Mikel J. Harry and J. Ronald Lawson in "Six Sigma Producibility Analysis and Process Characterization," Addison Wesley Publishing Co., pp.1-1 through 1-5, 1992. The Six Sigma program is also thoroughly discussed by G. J. Hahn, W. J. Hill, R. W. Hoerl, and S. A. Zinkgraf in "The Impact of Six Sigma Improvement—A Glimpse into the Future of Statistics", The American Statistician, 53, 3, August, pages 208–215; and by G. J. Hahn, N. Doganaksoy, and R. Hoerl in "The Evolution of Six Sigma", to appear in Quality Engineering, March 2000 issue.

Six Sigma analysis is a data driven methodology to improve the quality of products and services delivered to customers. Decisions made regarding direction, interpretation, scope, depth or any other aspect of quality effort should be based on actual data gathered, and not based on opinion, authority or guesswork. Key critical-to-quality (CTQ) characteristics are set by customers. Based on those CTQs, internal measurements and specifications are developed in order to quantify quality performance. Quality improvement programs are developed whenever there is a gap between the customer CTQ expectations and the current performance level.

The basic steps in a quality improvement project are first to define the real problem by identifying the CTQs and related measurable performance that is not meeting customer expectations. This real problem is then translated into a statistical problem through the collection of data related to the real problem. By the application of the scientific method (observation, hypothesis and experimentation), a statistical solution to this statistical problem is arrived at. This solution is deduced from the data through the testing of various hypotheses regarding a specific interpretation of the data. Confidence (prediction) intervals provide a key statistical tool used to accept or reject hypotheses that are to be tested. The arrived at statistical solution is then translated back to the customer in the form of a real solution.

In common use, data is interpreted on its face value. However, from a statistical point of view, the results of a measurement cannot be interpreted or compared without a consideration of the confidence that measurement accurately represents the underlying characteristic that is being measured. Uncertainties in measurements will arise from variability in sampling, the measurement method, operators and so forth. The statistical tool for expressing this uncertainty is called a confidence interval depending upon the exact situation in which the data is being generated.

Confidence interval refers to the region containing the limits or band of a parameter with an associated confidence level that the bounds are large enough to contain the true parameter value. The bands can be single-sided to describe an upper or lower limit or double sided to describe both upper and lower limits. The region gives a range of values, bounded below by a lower confidence limit and from above by an upper confidence limit, such that one can be confident (at a pre-specified level such as 95% or 99%) that the true population parameter value is included within the confidence interval. Confidence intervals can be formed for any of the parameters used to describe the characteristic of interest. In the end, confidence intervals are used to estimate the population parameters from the sample statistics and allow a probabilistic quantification of the strength of the best estimate.

In the case of the invention described herein, the calculated prediction intervals describe a range of values which contain the actual value of the sample at some given double-sided confidence level. For example, the present invention allows the user to change a statistically undependable statement, "There is 5.65 milligrams of Element Y in sample X", to, "There is 95% confidence that there is 5.65+/−0.63 milligrams of Element Y in sample X". A prediction interval for an individual observation is an interval that will, with a specified degree of confidence, contain a randomly selected observation from a population. The inclusion of the confidence interval at a given probability allows the data to be interpreted in light of the situation. The interpreter has a range of values bounded by an upper and lower limit that is formed for any of the parameters used to describe the characteristic of interest. Meanwhile and at the same time, the risk associated with and reliability of the data is fully exposed allowing the interpreter access to all the information in the original measurement. This full disclosure of the data can then be used in subsequent decisions and interpretations of which the measurement data has bearing.

Current generation inductively coupled plasma spectrophotometers use a linear calibration scheme to back calculate sample concentrations based on known calibration samples. By spiking all samples with a constant level of a particular element (usually scandium or yttrium) this element can be used as an internal calibration by normalizing all other element readings of this element. After specifying acceptable tolerances for read back samples, a typical batch run may contain several calibrations performed during the course of the run. For example, calibration samples can be run a total of six times for a particular data set. Each sample concentration must then be back calculated for each calibration. However, the calculations routinely performed by these instruments do not calculate confidence intervals for the back calculations of each sample concentration.

To calculate these parameters can be cumbersome, even if a hand-held calculator is used. To avoid the inconvenience of using calculators, look-up tables are often used instead, in which the various parameters of interest are listed in column's and correlated with each other. Nevertheless, these tables do not provide the user with enough flexibility, e.g., it is generally necessary to interpolate between the listed values. Furthermore, the user is not presented information in a way that is interactive, so that a "feel" for the numbers and the relationship of the various quantities to each other is lost.

Thus, there is a particular need for an apparatus and method for calculating confidence intervals under Six Sigma.

BRIEF SUMMARY OF THE INVENTION

An exemplary embodiment of the present invention is an apparatus and method for calculating error analysis. A method for calculating at least one confidence interval comprises activating a calculator. The user selects an input data. The calculator reformats the input data to an output data. The calculator generates a specific calibration summary using said output data. The calculator plots at least one linear calibration curve derived from the specific calibration summary. The calculator then plots at least one residual calibration value plot derived from the specific calibration summary. The calculator calculates at least one back-calculated unknown sample value. The calculator then calculates at least one confidence interval for said at least one back-calculated unknown sample value.

An apparatus for calculating error analysis, the apparatus comprises a set of instructions for calculating at least one confidence interval value.

These and other features and advantages of the present invention will be apparent from the following brief description of the drawings, detailed description, and appended claims and drawings.

BRIEF DESCRIPTION OF THE DRAWINGS

The invention will be further described in connection with the accompanying drawings in which:

FIG. 2 is the output data containing calibration standard values;

DETAILED DESCRIPTION OF THE INVENTION

Generally, inductively coupled plasma spectrophotometers contain procedures for processing inductively coupled plasma data files. The primary purpose of these procedures is to provide complete data analysis of all sample runs. Some of these calculations are routinely performed and output by the instrument, but some calculations required for Six Sigma analysis are not included in the data output.

Specifically, the invention utilizes procedures for calculating confidence intervals of predicted unknown sample concentrations based on the unknown's y reading and the current calibration. These predicted unknown sample concentrations or x values are referred to as the back-calculated x-values of the unknown sample concentration.

Figure 1:
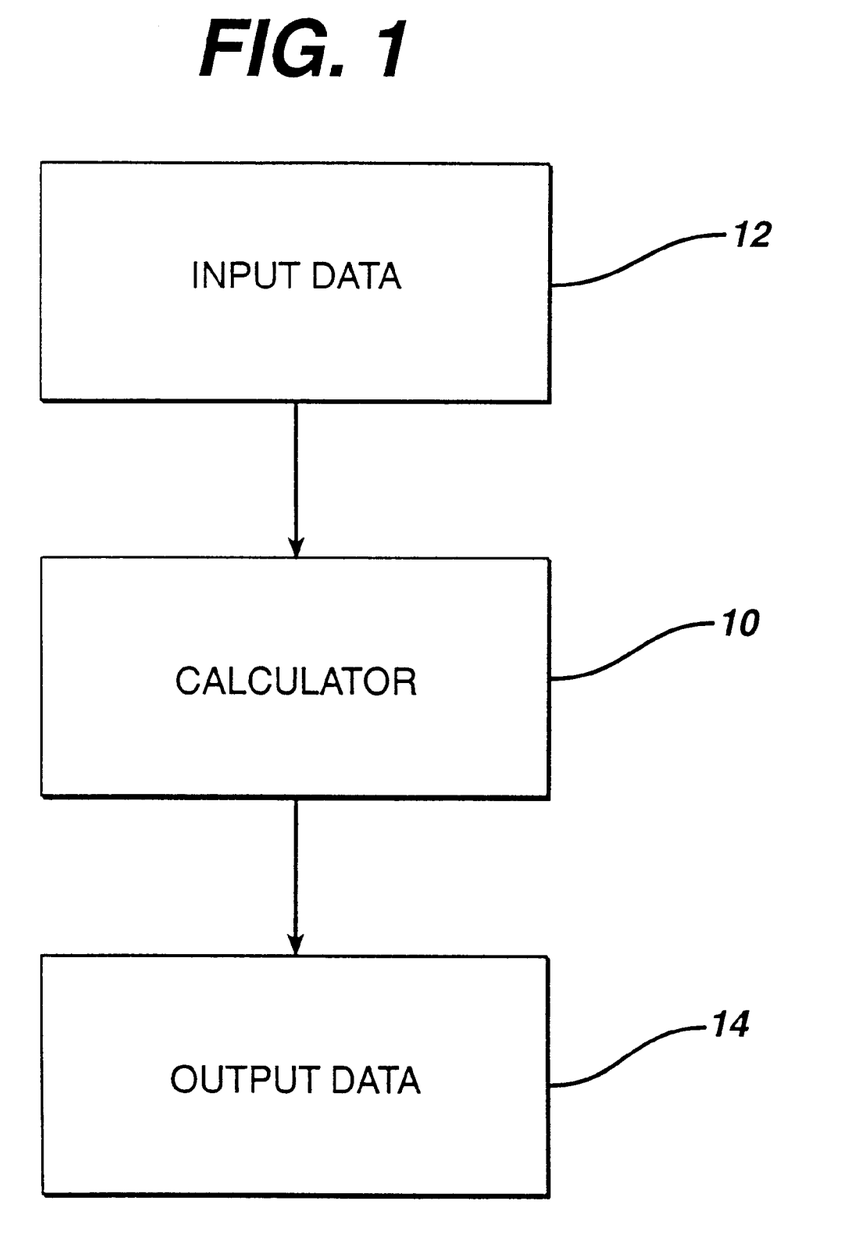
FIG. 1 is a flowchart depicting the calculator in operation.

Referring now to FIG. 1, a calculator 10 contains the procedures for processing input data 12 to generate output data 14. Input data 12 is a data file, which contains instrument readings of calibration standards and unknown samples. Output data 14 is a reformatted data file containing the requisite information to satisfy the input requirement of calculator 10.

Calculator 10 preferably is a macro of a spreadsheet program such as Excel®, Lotus®, or any Windows® based spreadsheet program. The exemplary embodiment of calculator 10 allows calculator 10 to be opened when needed or placed in an Excel® start directory, Lotus® start directory, or any Windows® based spreadsheet program directory so that it will read each time the program is started. Calculator 10 preferably processes input data 12 generated by both Varian Inductively Coupled Plasma Spectrophotometers (Varian ICP) and Perkin-Elmer Inductively Coupled Plasma Spectrophotometers (PE ICP). In an exemplary embodiment of the present invention calculator 10 distinguishes a PE ICP file from a Varian ICP file by the presence of either an analyte or an element. Calculator 10 will execute an internal instruction, when reformatting input data 12 to output data 14, to determine whether an analyte or an element is specified in input data 12. Calculator 10 will select a PE ICP format when it detects an analyte in input data 12. Accordingly, calculator 10 will select a Varian ICP format when it detects an element in input data 12. When calculator 10 selects a PE ICP format, calculator 10 will reformat input data 12 and calculate confidence intervals for each back-calculated x-value for an unknown sample using the same set of instructions for calculating confidence intervals for Varian ICP format.

Referring now to FIG. 2, output data 14 for a Varian ICP is displayed on an original worksheet 16 comprising the following parameters: Solution Label column 18, Type column 20, Element column 22, Solution Concentration column 24 ("Soln Conc"), Corrected Concentration column 26 ("Corr Conc"), Date column 28, Time column 30, Number of Replicates column 32 ("NumReps"), and at least one Replicates column 34. Solution Label column 18 contains the list of sample names. In an exemplary embodiment of the present invention, calculator 10 will reformat input data 12 into output data 14 for a PE ICP and create a worksheet containing parameters according to the specifications and requirements of the application(s) for the PE ICP. Accordingly, the parameters may change according to the specifications and requirements of the application for which the exemplary embodiment of the present invention is being used.

Number of Replicates column 32 includes the number of samples read by calculator 10. At least one replicates column 34 contains individual readings, one reading per column, of each calibration sample. Calibration standards are identified in Type column 20. The various elements included in the samples, calibration standards and an internal calibration standard 40 are listed in Element column 22. Corrected Concentration column 26 contains entries not used directly by calculator 10, except when internal calibration standard 40 is present. In that case, the entry in Corrected Concentration column 26 represents the scaling constant of internal calibration standard 40. Calculator 10 will identify at least one unknown sample replicate or calibration standard replicate when the subsequent name string is generated by incrementing the last character of the previous sample name. Unknown sample replicates and calibration standard replicates must be adjacent to each other in order to be recognized by calculator 10. Some examples of unknown sample replicates include the following: "Sample A and Sample B" or "1234-4" and "1234-5" and "1234-6". In an examplary embodiment of the present invention, when identifying replicate samples in output data 14 for a PE ICP, output data 14 will contain the designation "calib" in the name of any calibration sample listed in the worksheet. Furthermore, all other samples, including unknowns, read-back, and quality assurance samples, will not contain the designation "calib" so that calculator 10 may properly count and analyze these samples in a PE ICP file.

Figure 3:
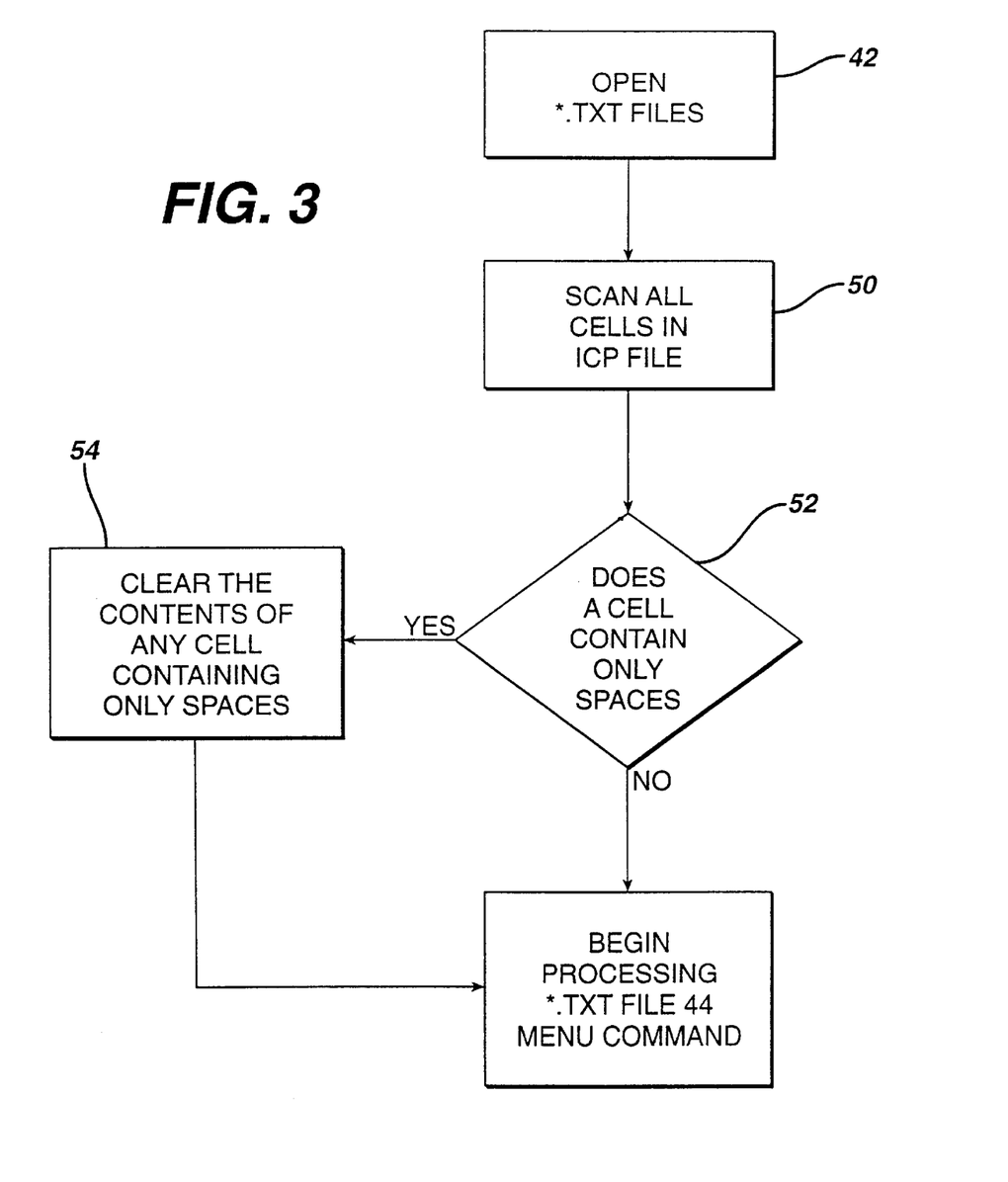
FIG. 3 is a flow chart illustrating the first parsing action.

Referring now to FIG. 3, in the preferred embodiment user is prompted to two menu commands in succession, which are the following: Open *.txt files 42 and Processing *.txt files 44. Calculator 10 uses Open *.txt files 42 to open and clean at least one cell 46 in output data 14, selected by the user, of unwanted, useless text, such as cells containing only a space 48 and cells containing only a dashed line indicated by "-".

User selects output data 14 with the menu command Open *.txt files 42. Open *.txt files 42 then scans each cell 46 in output data 14 at a block 50. A function block 52 determines if cell 46 contains only spaces 48 or a dashed line "-" indicating no data is present. Scan clears the contents of any cell 46 containing only spaces 48 or "-" at a block 54. Open *.txt files 42 finishes when cell 46 no longer contains only spaces 48 or dashed lines. The menu command Processing *.txt files 44 then commences.

Figure 4:
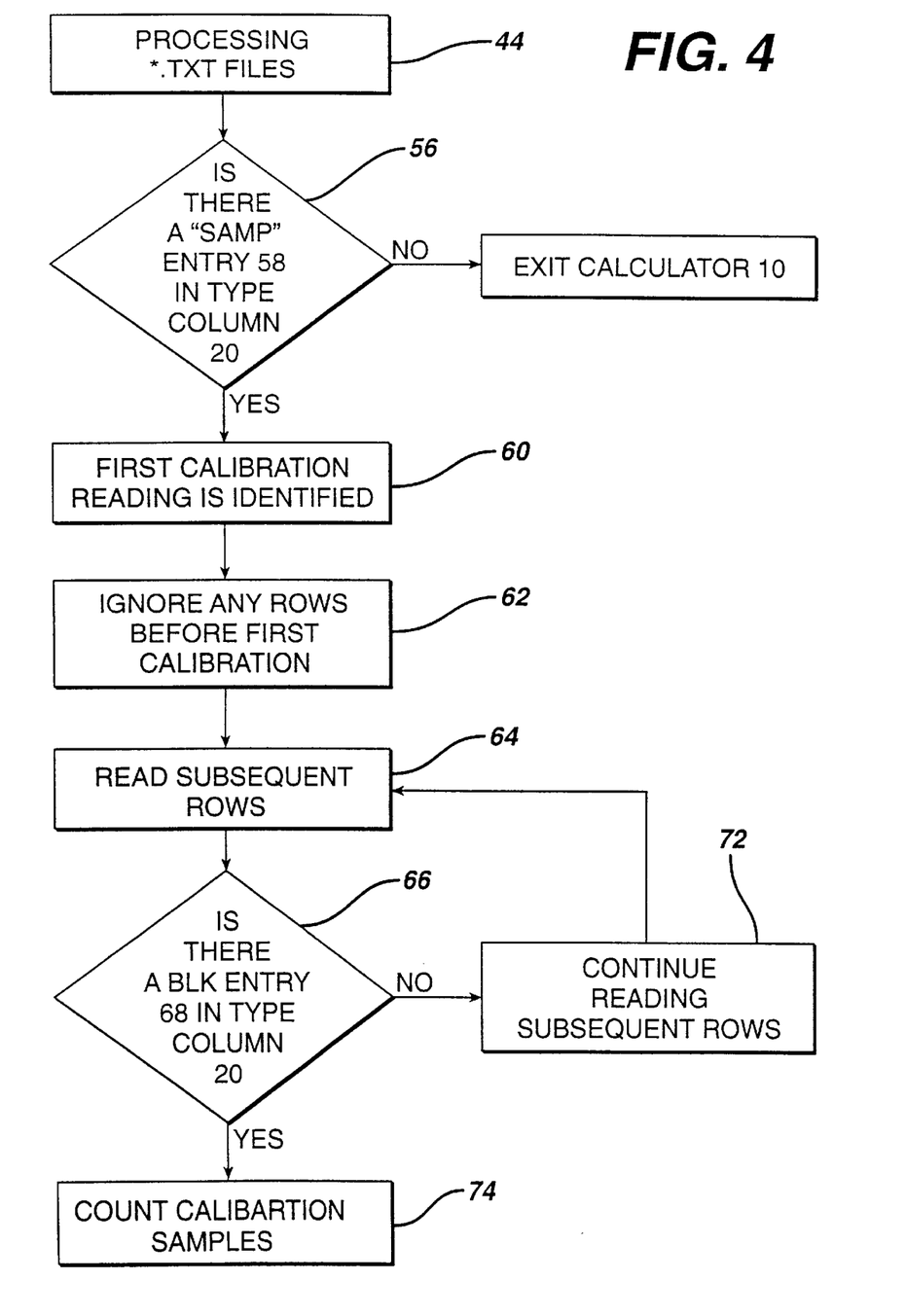
FIG. 4 is a flow chart illustrating the second parsing action.

Referring now to FIG. 4, Processing *.txt files 44 builds several new worksheets using output data 14 for a Varian ICP from original worksheet 16 (FIG. 2). A function block 56 determines where the first calibration readings begin by locating a "samp" entry 58 in Type column 20. When "samp" entry 58 is found, the first calibration reading is identified at a block 60. At a block 62 all rows before the first calibration reading are ignored. The row containing the first calibration reading and rows subsequent thereto are then read at a block 64. A function block 66 determines if there is a "BLK" entry 68 in Type column 20. When function block 66 does not find "BLK" entry 68, a block 72 instructs Processing *.txt files 44 to return to block 64 and continue reading subsequent rows. Once function block 66 finds a "BLK" entry 68 in Type column 20, the calibration samples are then counted at a block 74. Processing *.txt files 44 is then finished (FIG. 3).

Figure 5:
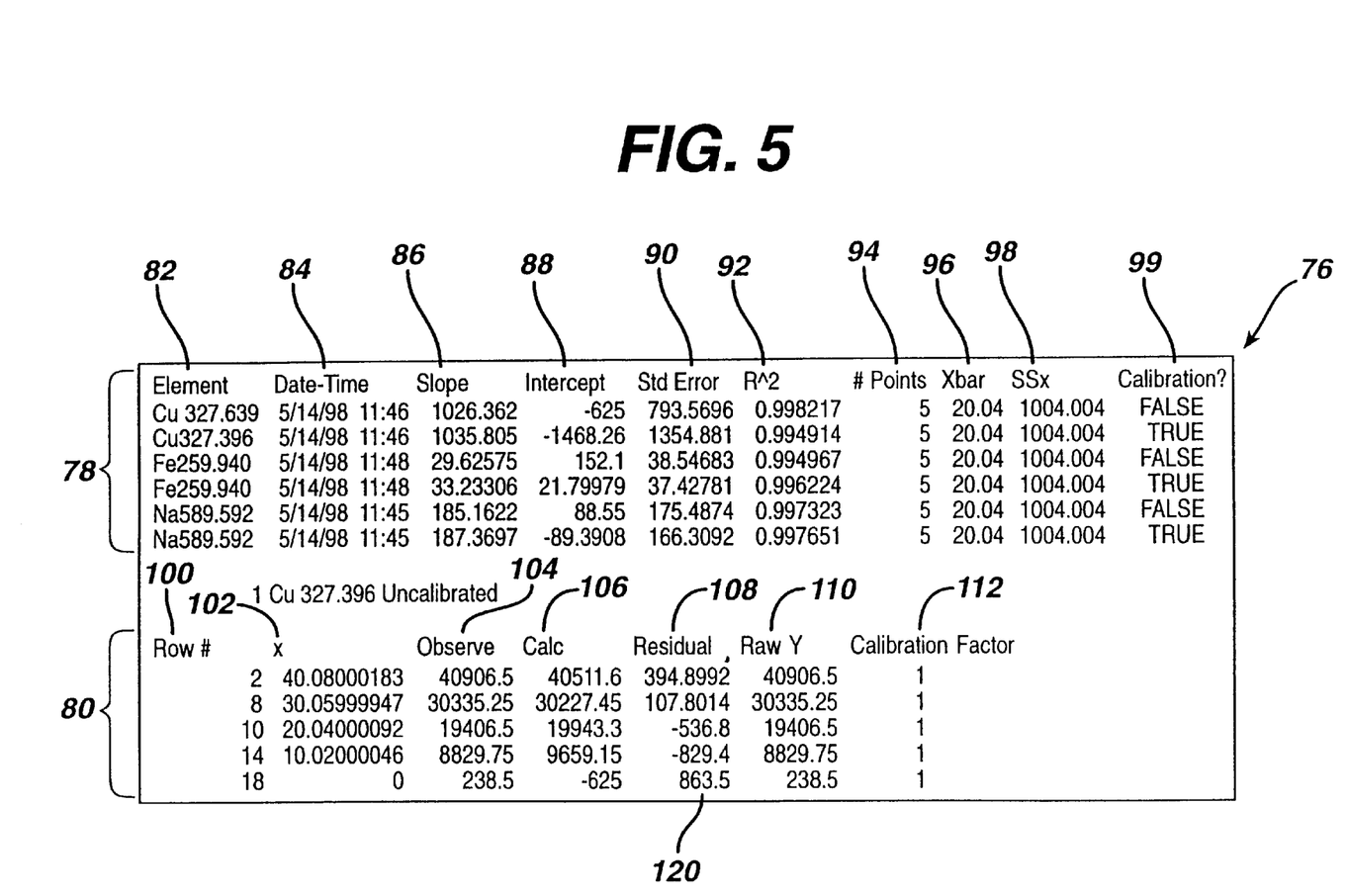
FIG. 5 is a worksheet containing the calibration summary.

Calibration worksheet 76 contains a calibration summary 78 and a specific calibration summary 80. Calibration summary 78 summarizes the fitting parameters for all calibration standard runs found in output data 14. In the case of multiple elements, each element's pair of calibration readings would be listed in a new row in calibration summary 78. If internal calibration standard 40 is enabled, an additional entry comprising an additional pair of calibration sample readings would be listed for each element. The calibration parameters can be examined along with the effect that internal calibration sample 40 has on the raw or normalized y-value of the calibration standard readings. The user is prompted to identify internal calibration standard 40 when using a Varian ICP file. A calibration standard or calibration reference is generally any of the standards of various types that indicate whether an analytical instrument of procedure is working within prescribed limits, examples are test solutions used with pH meters, and solutions with known concentrations (standard solutions) used with spectrophotometers.

Calibration summary 78 contains the following parameters: Element column 82, Date-Time column 84, Slope column 86, Intercept column 88, Standard Error column 90 ("Std Error"), R-squared column 92 ("$R^2$"), Number of Points column 94 ("# Points"), X-bar column 96, $SS_x$ column 98, and Calibration ? column 99. The slope value, intercept value, standard error value, $R^2$ value, x-bar value, and SSx value are standard statistical notations, which are further defined throughout *Applied Regression Analysis*, by Norman Draper and Harry Smith, Third Edition, Wiley, 1998. Accordingly, the parameters may change according to the specifications and requirements of the application for which the exemplary embodiment of the present invention is being used.

Specific calibration summary 80 is found below calibration summary 78. Specific calibration summary 80 defines the following parameters: Row Number column 100 ("Row #"), X value column 102 ("X"), Observed X value column 104 ("Observe"), Calculated X value column 106 ("Calculated"), Residual value column 108 ("Residual"), Raw Y value column 110 ("Raw Y"), and Calibration Factor column 112. Accordingly, the parameters may change according to the specifications and requirements of the application for which the exemplary embodiment of the present invention is being used.

Figure 6:
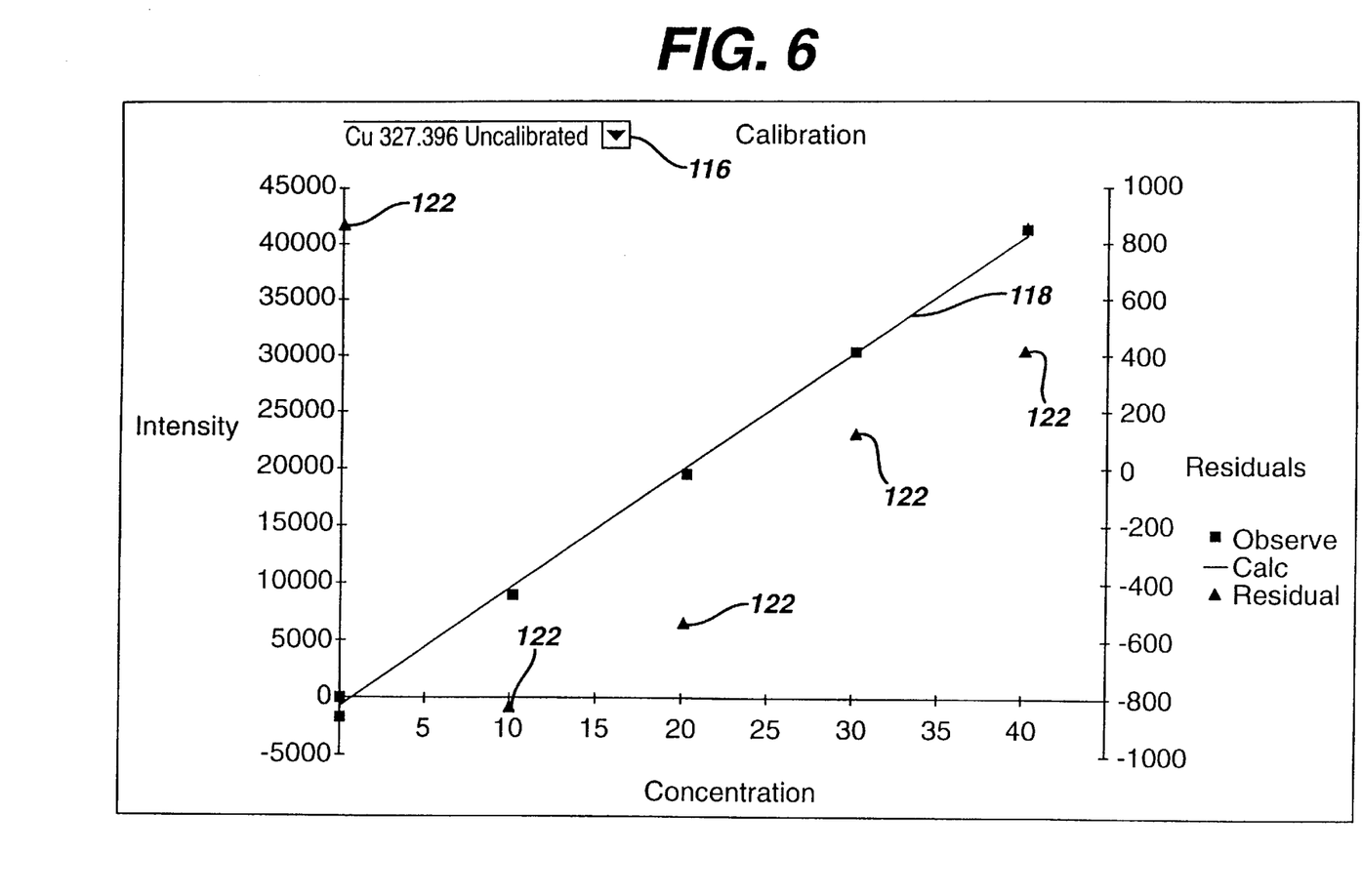
FIG. 6 is a graphic representation of the calibration summary of FIG. 5.

Referring now to FIG. 6, calibration chart 114 is a graphic representation of the calibration data taken from specific calibration summary 80. The calibration data is plotted along a least square best line fit 118 using at least three observed values located in Observed column 104. This set of calibration data is taken from specific calibration summary 80 and the values contained in slope column 86 and intercept column 88 of calibration summary 78. Drop-down control box 116 is present to allow each of the calibrations in specific calibration summary 80 to be viewed.

At least one calibration residual value 120 is included for diagnostic purposes. The calibration residual value plot 122 assesses the quality of the linear relationship of the calibration data. If a non-linear relationship exists, then additional terms exist that were not gathered in the calibration of the instrument. As a result, the calibration residual value plot 122 will form a curvature indicating a discrepancy in the linear relationship. However, if a linear relationship exists, the calibration residual values 120 will always scatter around a value equal to zero. Accordingly, the calibration residual value plot 122 will be a least squares best fit line.

Figure 7:
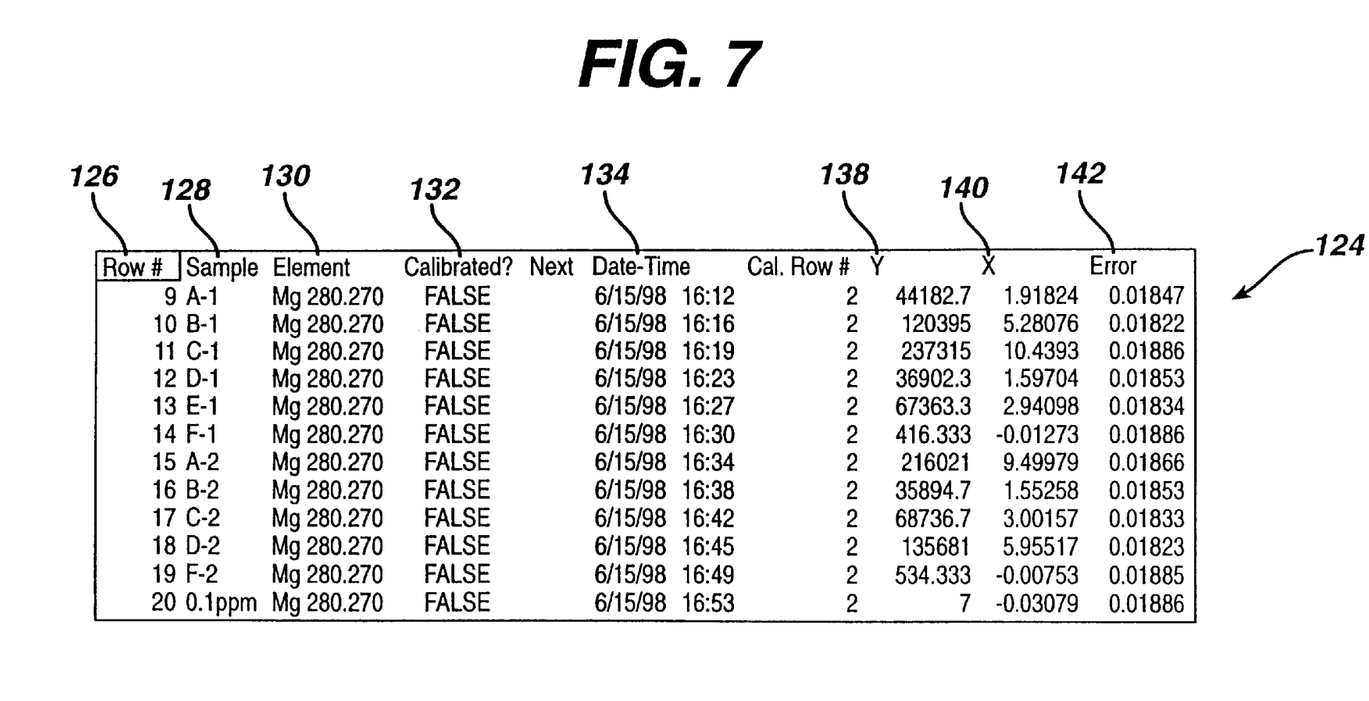
FIG. 7 is an intermediate worksheet containing unknown sample values.

The next new worksheet generated by calculator 10 is an intermediate worksheet 124 referred to as "Samples". Intermediate worksheet 124 is generated for internal requirements as well as consistency verification, which the user may want to perform. Intermediate worksheet 124 summarizes all non-calibration samples in output data 14. The values of unknown sample replicates 36 are not coalesced at this point. Referring now to FIG. 7, intermediate worksheet 124 includes the following parameters: Row number column 126 ("Row #"), Sample column 128, Element column 130, Calibrated ? column 132, Date-Time column 134, Calibration Row Number column 136 ("Cal. Row #"), Y-value column 138 ("Y"), X-value column 140 ("X"), and Error column 142. Accordingly, the parameters may change according to the specifications and requirements of the application for which the exemplary embodiment of the present invention is being used.

Row number column 126 contains the row number of output data 14. Y-value column 138 contains the instrument intensity reading, with possible internal standard scaling due to internal calibration standard 40, of an unknown sample. X-value column 140 contains a back-calculated x-value ($S_x$) 144 of an unknown sample.

Back-calculated x-value ($S_x$) 144, along with error analysis, is calculated using the following equation:

$$X = (Y\text{-intercept})/\text{slope},$$

is based on a linear correlation of the x and y values, respectively, of the calibration standard data and unknown sample data.

Through propagation of errors, the error in the back-calculated X-value ($S_x$) 144 is:

$$s_x = \frac{\sigma}{m}\sqrt{\frac{1}{N} + \frac{1}{M} + \frac{(X-\bar{x})^2}{\sum(x_i-\bar{x})^2}},$$

w where $\sigma$ (sigma) is the true product/process standard deviation or the standard error of the calibration fit. It is a combination of all influencing factors, including measurement, people, raw materials, etc. To find the true value of $\sigma$ might take never-ending data collection. As a result, $\sigma$ is estimated from sample data. N is the number of replicate readings of samples. The number of replicate readings N was determined at function block 134. Additional data, or larger the N value, will tighten the confidence interval and give a stronger and more accurate and precise representation of $\sigma$. M is the number of calibration samples. The number of calibration samples M is the value recorded by block 132. $x_i$ is the x value of M different calibrations samples. x is the average x value of the calibration samples. $S_x$ includes error from the calibration including covariance between the slope and intercept of the fit. This expression factors in error from the calibration including covariance between the slope and intercept of the fit.

The error analysis is taken from Applied Linear Statistical Models, by John Neter, William Wasserman and Michael H. Kutner, Irwin, Chicago, Ill., 1996, and Statistical Analysis in Chemistry and the Chemical Industry, by Carl A. Bennett and Norman L. Franklin, John Wiley & Sons, New York, 1954.

Figure 8:
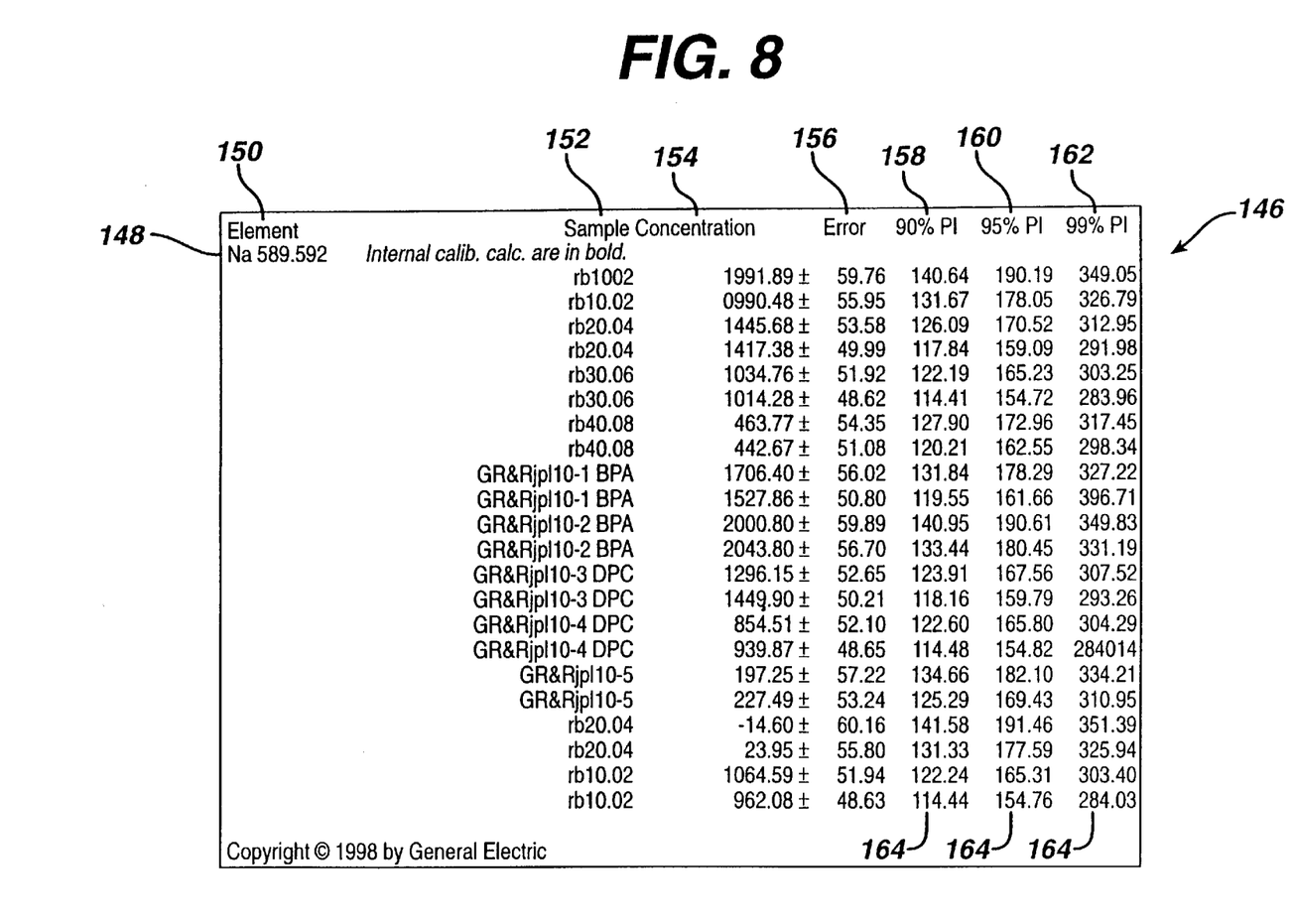
FIG. 8 is a worksheet summarizing all of the unknown sample values.

Referring now to FIG. 8, a final worksheet 146 contains a summary of data for at least one unknown sample 148. Final worksheet 146 includes the following parameters: Element column 150, Sample column 152, Concentration column 154, Error column 156, 90% Prediction Interval column 158, (90% PI), 95% Prediction Interval column 160 (95% PI), 99% Prediction Interval column 162 (99% PI).

It is important to note replicates readings have been combined in Final Worksheet 148. Concentration column 38 contains the sample concentration readings for at least one unknown sample 148, which are back-calculated x-values 144. Original sample concentrations prior to undergoing any necessary dilution factor are calculated based on additional information from output data 14. At least one confidence interval value 164 for each back-calculated x-value of unknown sample 148 is given in 90% Prediction Interval column 158, 95% Prediction Interval column 160, 99% Prediction Interval column 162, respectively, of final worksheet 146.

Confidence interval value 164 is calculated using the following equation:

$$X \pm t_{(1-\alpha/2(n-2))} S_x$$

where X is the back-calculated x-value or unknown sample input measurement. n is the number of pairs of calibration data, which comprises the observed values of the calibration standards. t is the upper $1-\alpha/2$ percentile of the t-distribution with $n-2$ degrees of freedom for a 95% prediction interval when $\alpha$ is set to 0.05. $\alpha$ is set to 0.01 for 99% prediction interval. The t-distribution value represents a probability value that is used to determine confidence intervals and comparison statements about the mean value(s) of the population sample or in this case the mean value(s) of the sample readings. The % confidence interval, such as 95% PI and 99% PI, for a specified parameter consists of a lower and an upper limit. The higher the confidence level the wider the confidence interval. The probability that the confidence level is incorrect, that is, does not contain the true parameter value, is expressed as $\alpha$ and assigned a value of either 0.05 or 0.01. The calculated error and degrees of freedom are statistical notations taken from Neter, et al.

The confidence level on the mean tightens by a factor of two for approximately every fourfold increase in the sample size. The sample size is selected upon both statistical and business criteria. Business criteria includes cost, time and available resources. However, business factors should be weighed after the "statistically correct" sample size is determined. Statistical criteria are related to discovering the difference between a sample characteristic and reality. Detection of smaller practical differences will require larger sample sizes. The sample size has little effect on the computation of the statistical values, which is the focus of the present invention. A best estimate mean can be formed with two observations as well as with one hundred observations. The increase in sample size does affect the confidence interval. Thus, the desired width of the confidence interval is what really determines the sample size. Usually, the detection of the true mean value is desired to be within some delta ($\delta$) of the true mean ($\mu$), hence the confidence interval on $\mu$ is usually used to compute an appropriate sample size. An overview of the use of confidence intervals and population sizes in the Six Sigma program is presented by Mario Perez-Wilson in "Six Sigma—Understanding the Concept, Implications and Challenges", Mario Perez-Wilson and Advanced Systems Consultants, 1999, and by Forrest W. Breyfogle III in "Implementing Six Sigma—Smarter Solutions Using Statistical Methods", John Wiley & Sons, 1999.

The confidence intervals calculated for each unknown sample concentration measurement exceeds the information provided by classical statistical analysis. The confidence interval more accurately quantifies the weight of the unknown sample by analyzing calibration data taken from a continuous response population. The continuous response population in the exemplary embodiment of the present invention is a typical batch run containing several calibrations that were run six times.

The confidence intervals calculated for each back-calculated x-value 144 of unknown sample 148 exceed the information provided by classical statistical analysis. The confidence interval more accurately quantifies the weight of the unknown sample by analyzing calibration data taken from a continuous response population, that is, the typical batch run containing several calibrations that were run six times.

The apparatus described above may use a hardware implementation or a combination of hardware and software. Attached is the macro listing using Microsoft Excel Implementation for a software implementation of part of the apparatus.

The present invention can be embodied in the form of computer-implemented processes and apparatuses for practicing those processes. The present invention can also be embodied in the form of computer program code containing instructions, embodied in tangible media, such as floppy diskettes, CD-ROMs, hard drives, or any other computer-readable storage medium, wherein, when the computer program code loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When the implementation on a general-purpose microprocessor, the computer program code segments configure the microprocessor to create specific logic circuits.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for calculating at least one confidence interval value, the method comprising:
   activating a calculator;
   selecting an input data;
   reformatting said input data to an output data;
   generating a specific calibration summary using said output data;
   plotting at least one linear calibration curve derived from said specific calibration summary;
   plotting at least one residual calibration value plot derived from said specific calibration summary;
   calculating at least one back-calculated unknown sample value; and
   calculating at least one confidence interval for said at least one back-calculated unknown sample value.

2. A method recited in claim 1, wherein said calculator is a set of instructions, wherein said set of instructions is a macro of a spreadsheet program.

3. A method recited in claim 1, wherein reformatting the input data further comprises:
   parsing said input data a first time; and
   parsing said input data a second time, wherein said parsing said input data a first time and a second time provides said calculator with the additional data to calculate said at least one confidence interval for said at least one back-calculated unknown sample value.

4. A method recited in claim 1, wherein said plotting said at least one linear calibration curve requires at least three pairs of calibration standard measurements.

5. A method recited in claim 1, wherein said plotting said at least one residual calibration value plot requires at least three pairs of calibration standard measurements.

6. A method recited in claim 1, wherein said method is used with an analytical instrument for performing quantitative chemical analysis, wherein said analytical instrument is an inductively coupled plasma spectrophotometer.

7. A method recited in claim 1, wherein said calculating said at least one back-calculated unknown sample value includes using a data derived from said at least one least squares best fit line.

8. A method recited in claim 1, wherein said method further comprises recalculating said at least one back-calculated unknown sample value when an internal calibration standard is changed, wherein said recalculating said at least one back-calculated unknown sample value also recalculates said at least one confidence interval value.

9. An apparatus for calculating statistical error analysis, comprising a set of instructions for calculating at least one confidence interval value, said set of instructions comprising:
   an instruction to activate a calculator;
   an instruction to select an input data;
   an instruction to reformat said input data into an output data;
   an instruction to generate a calibration summary from said output data;
   an instruction to generate a specific calibration summary from said output data;
   an instruction to plot at least one least-squares best fit line from said calibration summary and said specific calibration summary;
   an instruction to plot at least one residual calibration value plot from said calibration summary and said specific calibration summary;
   an instruction to calculate at least one back-calculated x-value for said at least one unknown sample; and
   an instruction to calculate the at least one confidence interval value for said least one back-calculated x-value.

10. A method recited in claim 9, wherein said calculating said at least one back-calculated x-value includes using a data derived from said at least one least squares best line fit.

11. A method recited in claim 9, wherein said instruction to calculate said at least one back-calculated x-value further comprises recalculating said at least one back-calculated x-value when an internal calibration standard is changed, wherein said recalculating said at least one back-calculated x-value also recalculates said at least one confidence interval value.

12. An article of manufacture comprising:
   a computer usable medium having set of instruction means embodied therein for calculating at least one confidence interval value for at least one back-calculated x-value for at least one unknown sample, an article of manufacturing comprising:
   set of instruction means for causing the set of instructions to select an input data comprising at least three pairs of values based on at least three pairs of calibration standard values;
   set of instruction means for causing the set of instructions to reformat said input data into an output data;

set of instruction means for causing the set of instructions to plot at least one least-squares best fit line from said output data;

set of instruction means for causing the set of instructions to plot at least one residual calibration value plot from said output data;

set of instruction means for causing the set of instructions to calculate at least one back-calculated x-value for said at least one unknown sample; and set of instruction means for causing the set of instructions to calculate at least one confidence interval value for said at least one back-calculated x-value.

13. A method recited in claim 12, wherein said set of instruction means for causing set of instructions to calculate said at least one back-calculated x-value includes using a data derived from said at least one least squares best line fit.

14. A method recited in claim 12, wherein said set of instruction means for causing said set of instructions to calculate said at least one back-calculated x-value further comprises recalculating said at least one back-calculated x-value when an internal calibration standard is changed, wherein said recalculating said at least one back-calculated x-value also recalculates said at least one confidence interval value.

15. A system comprising a computer usable medium having a set of instructions for calculating at least one confidence interval, said set of instructions comprising:

an instruction to select an input data comprising at least three pairs of values based on at least three pairs of calibration standard values;

an instruction to reformat said input data into an output data;

an instruction to plot at least one least-squares best fit line from said output data;

an instruction to plot at least one calibration residual value plot from said output data;

an instruction to calculate at least one back-calculated x-value for at least one unknown sample; and an instruction to calculate at least one confidence interval value for said at least one back-calculated x-value.

16. A method recited in claim 15, wherein said instruction to calculate said at least one back-calculated x-value includes using a data derived from said at least one least squares best line fit.

17. A method recited in claim 15, wherein said instruction to calculate said at least one back-calculated x-value further comprises recalculating said at least one back-calculated x-value when an internal calibration standard is changed, wherein said recalculating said at least one back-calculated x-value also recalculates said at least one confidence interval value.

18. A program storage device readable by machine, tangibly embodying a program of instructions executable by the machine to perform method steps for calculating at least one confidence interval, comprising:

activating a calculator:

selecting an input data;

reformatting said input data into an output data;

generating a calibration summary using said output data;

plotting at least one linear calibration curve derived from said calibration summary;

plotting at least one calibration residual value plot derived from said calibration summary;

calculating at least one back-calculated unknown sample value; and calculating at least one confidence interval for said at least one back-calculated unknown sample value.

\* \* \* \* \*